US012621401B2

(12) United States Patent
Yanagi

(10) Patent No.: US 12,621,401 B2
(45) Date of Patent: May 5, 2026

(54) COMMUNICATION SYSTEM AND IMAGE OBTAINING DEVICE CONFIGURED TO TRANSMIT IMAGE DATA AND TO TRANSMIT ENCRYPTION KEY, NONTRANSITORY COMPUTER-READABLE RECORDING MEDIUM STORING COMPUTER READABLE INSTRUCTIONS FOR IMAGE OBTAINING DEVICE, AND CONTROLLING METHOD FOR IMAGE OBTAINING DEVICE

(71) Applicant: BROTHER KOGYO KABUSHIKI KAISHA, Nagoya (JP)

(72) Inventor: Satoru Yanagi, Obu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/432,384

(22) Filed: Feb. 5, 2024

(65) Prior Publication Data

US 2025/0203032 A1 Jun. 19, 2025

(30) Foreign Application Priority Data

Dec. 15, 2023 (JP) ................................. 2023-211812

(51) Int. Cl.
*H04N 1/44* (2006.01)
*H04N 1/00* (2006.01)
*H04N 1/32* (2006.01)

(52) U.S. Cl.
CPC ....... *H04N 1/4486* (2013.01); *H04N 1/00209* (2013.01); *H04N 1/0084* (2013.01); *H04N 1/00875* (2013.01); *H04N 1/32117* (2013.01);

*H04N 1/444* (2013.01); *H04N 2201/3246* (2013.01); *H04N 2201/3281* (2013.01)

(58) Field of Classification Search
CPC ............. H04N 1/4486; H04N 1/00209; H04N 1/32117; H04N 1/444; H04N 1/00838–00883; H04N 2201/3246; H04N 2201/3281
See application file for complete search history.

(56) References Cited

U.S. PATENT DOCUMENTS 7,512,791 B1 * 3/2009 Sato ..................... H04N 1/4486
713/168
2006/0212715 A1 9/2006 Terao
(Continued)

FOREIGN PATENT DOCUMENTS

JP 2006-262373 A 9/2006
JP 2020-065129 A 4/2020
(Continued)

*Primary Examiner* — Nicholas Pachol
(74) *Attorney, Agent, or Firm* — Kenealy Vaidya LLP

(57) ABSTRACT

An image obtaining device includes a communication interface configured to communicate with a terminal and a controller in communication with the communication interface. The controller configured to: generate encrypted image data using an encryption key and image data received by the controller, transmit the encrypted image data to the terminal via the communication interface; and transmit the encryption key to the terminal via the communication interface in a first situation, wherein the encryption key is not transmitted to the terminal in a second situation different from the first situation.

12 Claims, 7 Drawing Sheets

(56) References Cited

U.S. PATENT DOCUMENTS

| | | | |
|---|---|---|---|
| 2009/0003856 A1* | 1/2009 | Tanaka ............... | H04N 1/00864 |
| | | | 399/45 |
| 2009/0196529 A1* | 8/2009 | Su ...................... | H04N 1/00875 |
| | | | 382/306 |
| 2010/0073740 A1* | 3/2010 | Kojima .............. | H04N 1/00222 |
| | | | 358/474 |
| 2010/0074442 A1* | 3/2010 | Ohara .................. | H04N 1/4486 |
| | | | 713/168 |
| 2010/0079823 A1* | 4/2010 | Miyazawa ......... | H04N 1/00222 |
| | | | 358/474 |
| 2016/0261770 A1* | 9/2016 | Sasahara ............... | G06F 21/604 |
| 2020/0120220 A1 | 4/2020 | Tonegawa | |
| 2020/0296071 A1* | 9/2020 | Li ........................... | G06T 1/005 |

FOREIGN PATENT DOCUMENTS

| | | | |
|---|---|---|---|
| JP | 2022-41055 A | 3/2022 | |
| JP | 2022-100850 A | 7/2022 | |

* cited by examiner

| USER NAME | PASSWORD | ATTRIBUTE |
|-----------|----------|-----------|
| USER1 | XXX1 | HIGH |
| USER2 | XXX2 | LOW |
| ... | ... | ... |

OVERVIEW OF PULL SCAN AND PUSH SCAN

FIRST EMBODIMENT: PULL SCAN

FIRST EMBODIMENT: PUSH SCAN

SECOND EMBODIMENT

THIRD EMBODIMENT

FOURTH EMBODIMENT

COMMUNICATION SYSTEM AND IMAGE OBTAINING DEVICE CONFIGURED TO TRANSMIT IMAGE DATA AND TO TRANSMIT ENCRYPTION KEY, NONTRANSITORY COMPUTER-READABLE RECORDING MEDIUM STORING COMPUTER READABLE INSTRUCTIONS FOR IMAGE OBTAINING DEVICE, AND CONTROLLING METHOD FOR IMAGE OBTAINING DEVICE

This application claims priority from Japanese Patent Application No. 2023-211812 filed on Dec. 15, 2023. The entire content of the priority application is incorporated herein by reference.

BACKGROUND ART

A known Multi-Function Peripheral (MFP) performs scanning in accordance with a scan instruction from a smartphone and transmits a file generated by the scanning to the smartphone.

DESCRIPTION

Various kinds of data are described in the file received by the MFP. From the viewpoint of security, information needs appropriate protection. Aspects of the disclosure provide a technique for appropriately protecting information included in an image.

An image obtaining device according to an aspect of the disclosure may include a communication interface configured to communicate with a terminal and a controller in communication with the communication interface. The controller is configured to: generate encrypted image data using an encryption key and image data received by the controller; transmit the encrypted image data to the terminal via the communication interface; and transmit the encryption key to the terminal via the communication interface in a first situation, wherein the encryption key is not transmitted to the terminal in a second situation different from the first situation.

According to the above configuration, the image data is protected by being encrypted with the encryption key. The encryption key is transmitted to the terminal in the first situation, but is not transmitted to the terminal device in the second situation. In the second situation, the information included in the image can be protected more strongly than in the first situation. Thus, the information included in the image may be appropriately protected.

A communication system according to an aspect of the disclosure may include an image obtaining module and a controller. The controller is in communication with the image obtaining module and configured for communication with a terminal and is configured to: cause the image obtaining module to obtain image data; encrypt the image data if an instruction to obtain image data is received from the terminal; communicate at least one of the encrypted image data or non-encrypted image data to the terminal, the controller further configured to perform at least one of a first process or a second process, wherein: the first process includes communication of an encryption key to the terminal if a user initiates, at the terminal, communication of the encrypted image data to the terminal and a user authorizes communication of the encryption key, and communication of the non-encrypted image data to the terminal if a user initiates, at the image obtaining module, communication of the non-encrypted image data to the terminal; and the second process includes communication of the encryption key to the terminal if a user initiates, at the image obtaining module, communication of the encrypted image data to the terminal.

According to the above configuration, the image data is protected by being encrypted and an encryption key is transmitted if a user initiates, at the terminal, communication of the encrypted image data to the terminal and a user authorizes communication of the encryption key, or if a user initiates, at the image obtaining module, communication of the encrypted image data to the terminal. Thus, the information included in the image may be appropriately protected.

A computer program for implementing the image obtaining device and a non-transitory computer-readable recording medium storing the computer program may have novelty and utility. In addition, a method for controlling the image obtaining device may also have novelty and utility.

FIRST EMBODIMENT

Figure 1:
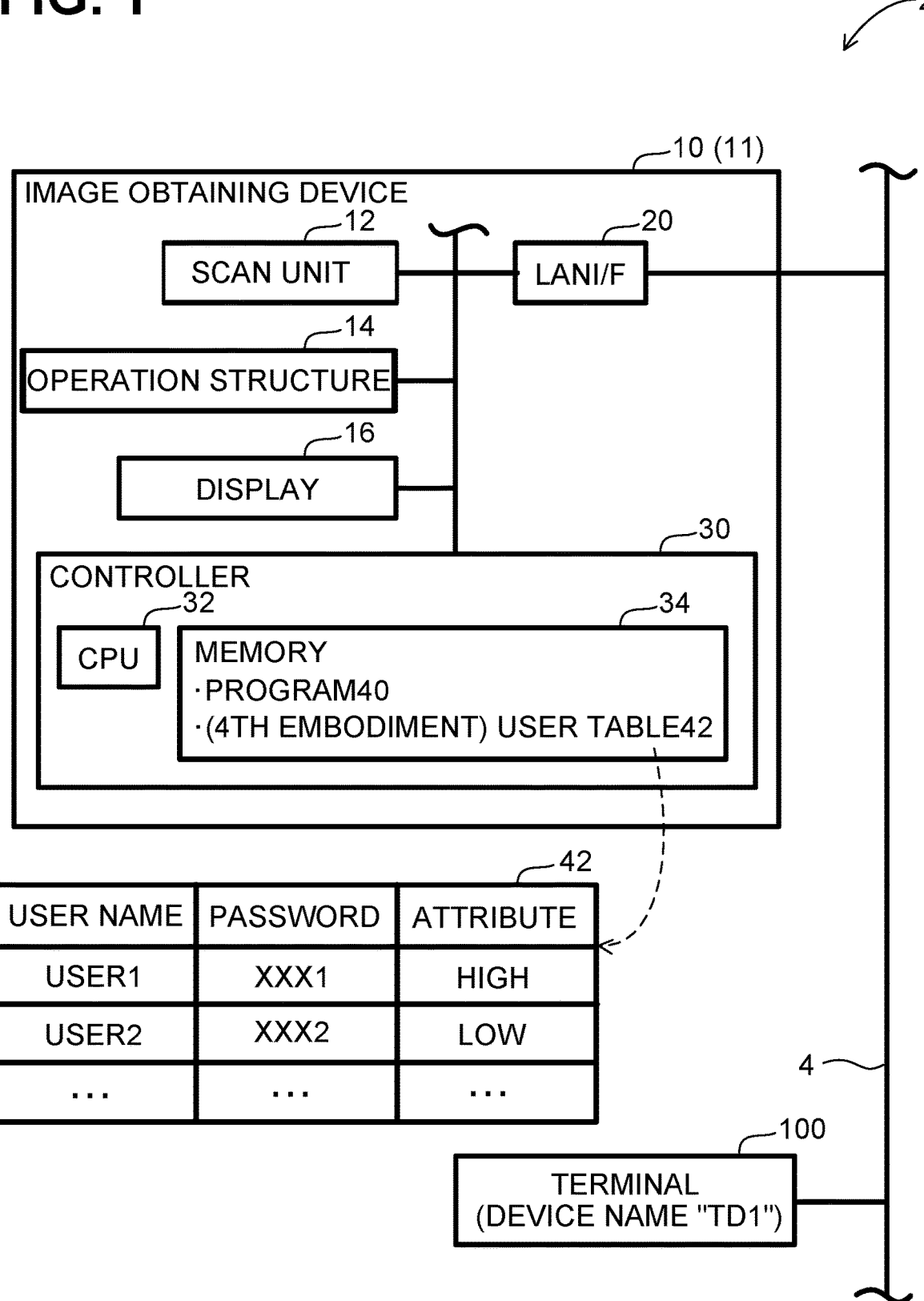
FIG. 1 is a configuration of a network system.

The Configuration of the Network System 2; FIG. 1

The network system 2 includes an image obtaining device 10 and a terminal 100. The image obtaining device 10 has a capability of communicating with the terminal 100 via a wireless or wired LAN 4. The terminal 100 is a device such as a desktop PC, a laptop PC, a smartphone, a tablet terminal. The name "td1" is assigned to the terminal 100. A control program for controlling the image obtaining device 10 is installed in the terminal 100. The control program is provided by a vendor of the image obtaining device 10.

Configuration of the Image Obtaining Device 10; FIG. 1

The image obtaining device 10 has a capability of performing a function of obtaining an image. The image obtaining device may be a peripheral device (e.g., a scanner) capable of performing a document reading function, i.e., a scan function. Further, the image obtaining device 10 may be a multi-function device having a capability of performing multiple functions such as a print function and a FAX function in addition to the scan function.

The image obtaining device 10 includes a scan unit 12, an operation unit 14, a display unit 16, a LAN interface 20, and a controller 30. Each of units 12, 14, 16, 20 and 30 are connected to housing 11. Hereinafter, "interface" will be referred to as "I/F".

The scan unit 12 is a unit for reading a document, and includes an image sensor such as a charge-coupled device (CCD) or a contact image sensor (CIS). The operation unit 14 may include a touchscreen and/or a mechanical button. The touchscreen may be configured to display icons. The mechanical button may be a part of a keypad assembly. The user can input various instructions to the image obtaining device 10 by operating the operation unit 14. The display unit 16 includes a display that displays various information, and is a liquid crystal display or an organic EL display. LAN I/F 20 is connected to the LAN 4 for performing communication via the LAN 4.

The controller 30 includes a CPU 32 and a memory 34. The memory 34 stores a program 40. The CPU 32 executes various processing in accordance with the program 40. The program 40 includes a plurality of programs such as a scan program for causing the scan unit 12 to perform scanning.

The memory 34 includes, for example, a nonvolatile memory and/or a volatile memory. An example of the non-volatile memory may include a hard disk drive (HDD), a read only memory (ROM), a solid state drive (SSD), or a flash memory. An example of the volatile memory may include a random access memory (RAM). The program 40 is stored in the non-volatile memory. The CPU 32 executes various processing in accordance with a program loaded from the non-volatile memory to the volatile memory.

Figure 2:
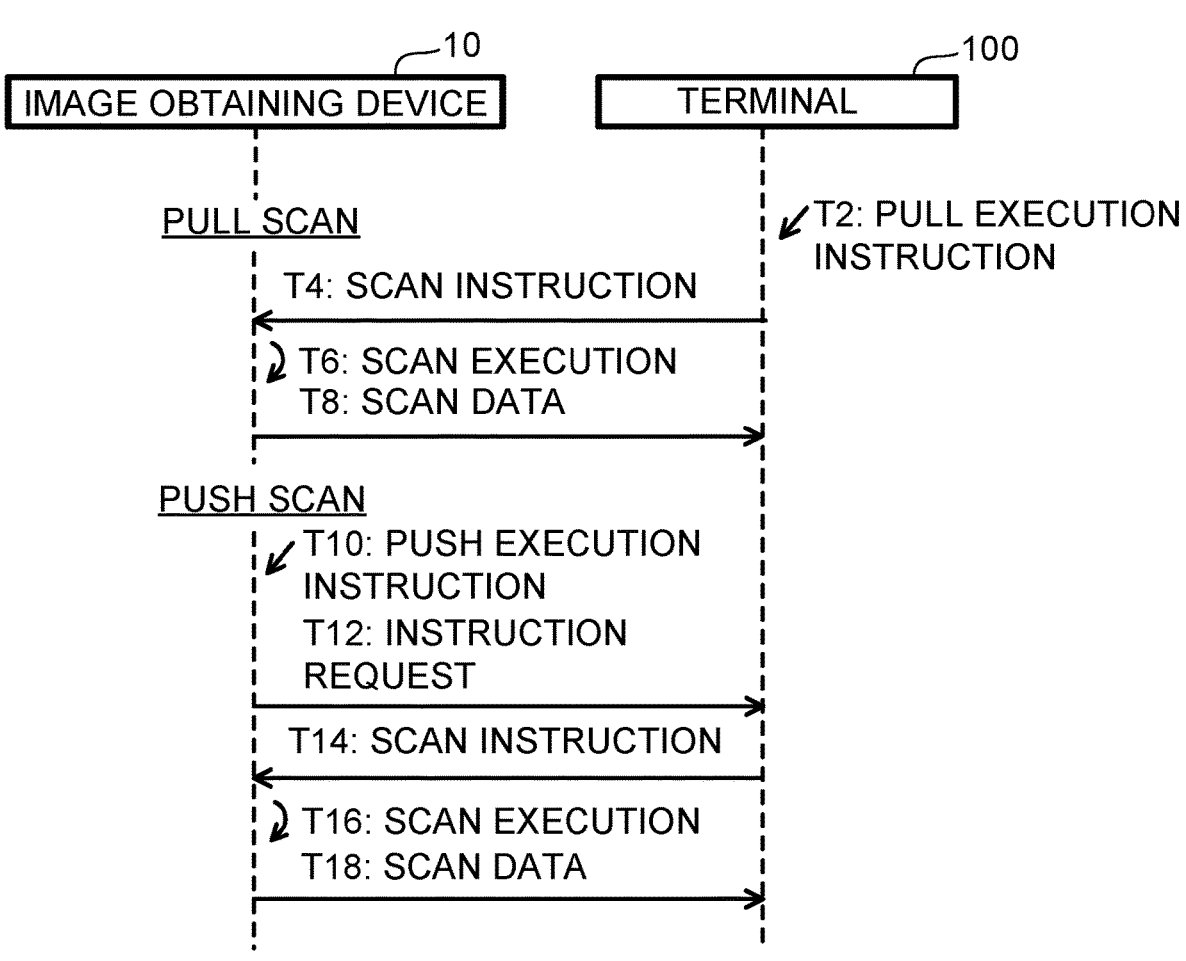
FIG. 2 is a sequence diagram of an overview of pull scan and push scan.

Overview of Pull Scan and Push Scan; FIG. 2

The image obtaining device 10 has a capability of performing a pull scan and a push scan so as to cause the scan unit 12 to perform scanning. The pull scan is a process performed in response to a trigger of a predetermined input from an operation unit (e.g., a keyboard) of the terminal 100. The push scan is a process performed in response to a trigger of a predetermined input from the operation unit 14 of the image obtaining device 10.

In the following, for ease of understanding, processes executed by the CPU 32 of the image obtaining device 10 will be described with reference to operations performed by the image obtaining device 10. Communication between the image obtaining device 10 and the terminal 100 is performed via the LAN 4 and the LAN I/F 20, unless otherwise specified. Therefore, the descriptions "via the LAN 4" and "via the LAN I/F 20" may be omitted when describing the communication between the image obtaining device 10 and the terminal 100.

The overview of the pull scan is as follows. In T2, the user inputs a pull scan instruction to the operation unit of the terminal 100 for performing the pull scan. Upon receiving the pull scan instruction in T2, in T4, the terminal 100 transmits a scan instruction to the image obtaining device 10. In response to receiving the scan instruction from the terminal 100 in T4, the image obtaining device 10 calls the scan program. In T6, in accordance with the scan instruction the image obtaining device 10 executes the scan program to cause the scan unit 12 to perform scanning. Then, in T8 the image obtaining device 10 transmits scan data generated by scanning in T6 to the terminal 100. Here, the scan data may be obtained by converting raw data generated by the scan unit 12 into a predetermined file format. The scan data may be in JPEG format. In a modification, the scan data may be the raw data itself.

The overview of the push scan is as follows. In T10, the user inputs, to the operation unit 14, a push scan instruction for performing the push scan. In response to receiving the push scan instruction in T10, in T12, the image obtaining device 10 transmits an instruction request for requesting transmission of a scan instruction to the terminal 100. Upon receiving the instruction request from the image obtaining device 10 in T12, in T14, the terminal 100 transmits a scan instruction to the image obtaining device 10 in accordance with the instruction request. The processes T16 and T18 are similar to or the same as the processes T6 and T8.

The scan instruction in T4 of the pull scan and the scan instruction in T14 of the push scan are commands described in the same format. By using a scan instruction common to the pull scan and the push scan, a scan program common to the pull scan and the push scan may be used. In a modification, the processes of T12 and T14 may be omitted.

Figure 3:
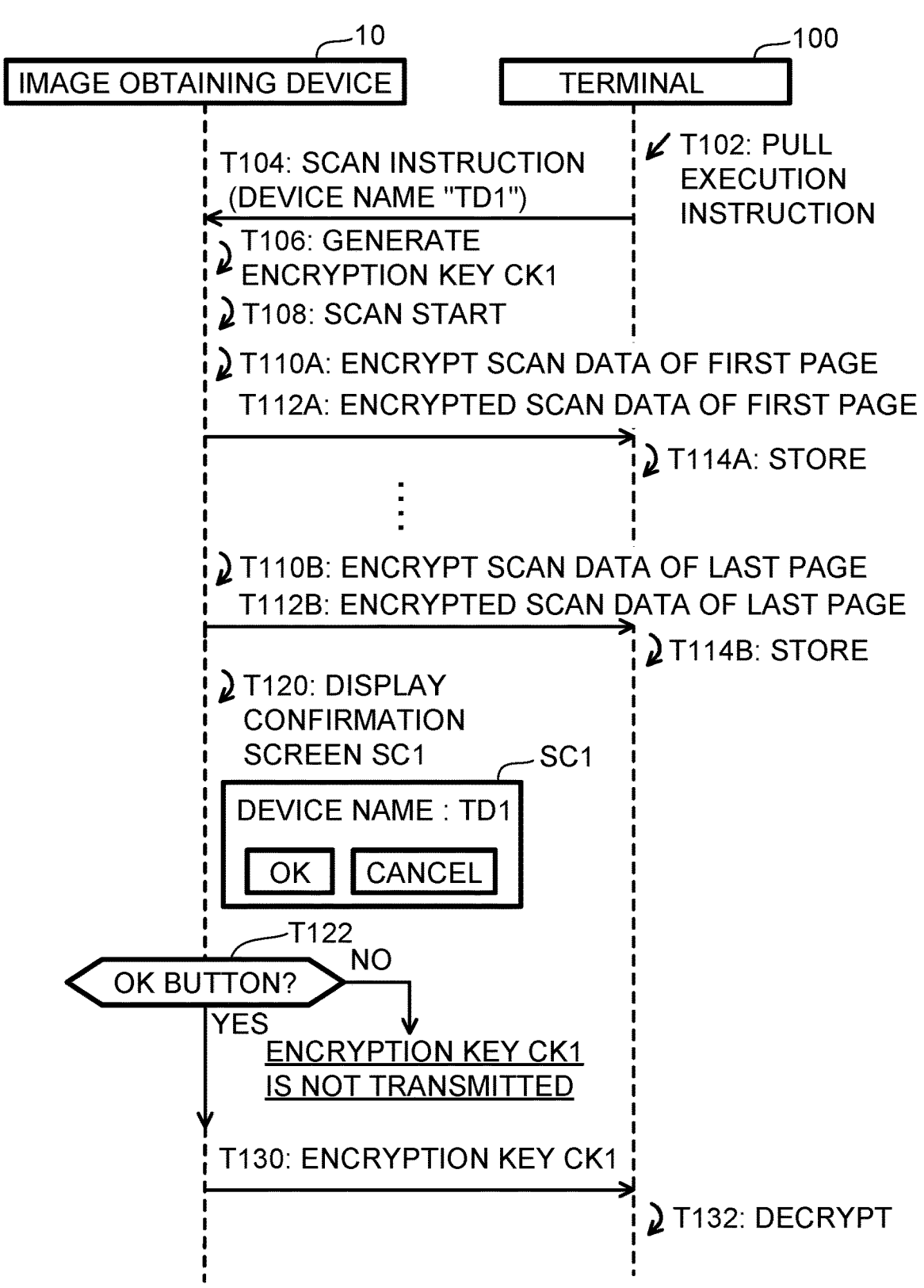
FIG. 3 is a sequence diagram of a specific case of the pull scan.

Pull Scan; FIG. 3

An example of the pull scan according to the present embodiment is described with reference to FIG. 3. Processes T102 and T104 are examples of the processes T2 and T4 in FIG. 2, and the scan instruction in T104 includes the device name "td1" of the terminal 100.

Upon receiving the scan instruction from the terminal 100 in T104, in T106, the image obtaining device 10 generates a unique encryption key CK1. The encryption key CK1 is, for example, a common key according to the Advanced Encryption Standard (AES).

A process T108 subsequent to the process T106 is an example of the process T6 in FIG. 2. In T106, the image obtaining device 10 starts scanning the document. In this embodiment, the document is a paper document and includes a plurality of pages. In T110A, the image obtaining device 10 scans a first page of the document to generate scan data of the first page, and encrypts the scan data of the first page by using the encryption key CK1. In T112A, the image obtaining device 10 transmits the encrypted scan data of the first page to the terminal 100. As a result, in T114A, the terminal 100 stores the encrypted scan data of the first page received from the image obtaining device 10. The image obtaining device 10 executes the same processing as T110A to T114A for all of the plurality of pages. In T110B to T114B, the scan data of the last page is generated, and the encrypted scan data of the last page that is encrypted with the encryption key CK1 is transmitted to the terminal 100. T112A and T112B are examples of T8 in FIG. 2. After transmitting the encrypted scan data of the last page to the terminal 100, the encrypted scan data of all of the plurality of pages of the document is stored in the terminal 100. The document may be an electronic document instead of a paper document. In a case where the document is an electronic document, the image obtaining device 10 may obtain the electronic document from a storage media in process such as T110A, and may encrypt data of each page of the electronic document. Then, the encrypted data may be stored in the terminal 100.

Upon completion of the transmission of the encrypted scan data of the last page in T112B, in T120, the image obtaining device 10 displays a confirmation screen SC1 on the display unit 16. The confirmation screen SC1 is a screen for receiving a user confirmation that the encryption key CK1 generated in T106 is transmitted to the terminal 100. The confirmation screen SC1 includes an OK button, a Cancel button, and the device name "td1" received from the terminal 100 in T104. The user may select the OK button if the user recognizes the displayed terminal device name "td1" corresponds to the terminal 100.

In T122, the image obtaining device 10 determines whether selecting the OK button of the confirmation screen SC1 is performed on the operation unit 14. In a case where the user determines that the device name "td1" displayed on the confirmation screen SC1 matches the device name "td1" of the terminal 100 to which the user has input the pull scan instruction in T102, the user selects the OK button. In response to determining that selecting the OK button has been performed (YES in T122), in T130, the image obtaining device 10 transmits the encryption key CK1 to the terminal 100.

In T130, the terminal 100 receives the encryption key CK1 from the image obtaining device 10. In T132, the terminal 100 uses the encryption key CK1 received from the image obtaining device 10 in T130 to decrypt the encrypted scan data of all of the plurality of pages of document stored in T114A and T114B. Accordingly, the decrypted scan data representing all of the plurality of pages of the document is stored in the terminal 100, and an image representing the document is displayed on the terminal 100.

Further, in a case where the user determines that the device name "td1" displayed on the confirmation screen SC1 does not match the device name "td1" of the terminal 100, the user selects the Cancel button. In a case where it is determined that selecting the Cancel button has been performed (NO in T122), the image obtaining device 10 does not perform the process of T130 and ends the process of FIG. 3. That is, the encryption key CK1 is not transmitted to the terminal 100. In this case, the encrypted scan data of all of the plurality of pages of the document stored in the terminal 100 is not decrypted, and the image representing the document is not displayed on the terminal 100.

According to the above configuration, the scan data is protected while the scan data is encrypted with the encryption key CK1. Assuming that the image obtaining device 10 may be located in an office, an employee of an office may operate the image obtaining device 10. The employee also operates the terminal 100 to perform the pull scan. The employee knows the device name "td1" displayed on the confirmation screen SC1 of the image obtaining device 10, determines that the device name "td1" displayed on the confirmation screen SC1 corresponds to the terminal 100, and selects the OK button on the confirmation screen SC1. In this case, the encryption key CK1 is transmitted to the terminal 100 (YES in T122), and the employee may see the image of the document displayed on the terminal 100.

Further, a situation may be assumed where an unauthorized person other than the employee of the office operates to perform the pull scan in an unauthorized manner with a terminal located where the unauthorized person is. The unauthorized person may not be able to reach the image obtaining device 10 in the office. Therefore, the unauthorized person may also not be able to select the OK button of the confirmation screen SC1. Further, the employee of the office may recognize that an unknown device name is displayed on the confirmation screen SC1 and may feel suspicious. In this case, the employee of the office determines that the device name displayed on the confirmation screen SC1 of the image obtaining device 10 does not corresponds what the employee knows, and selects the Cancel button on the confirmation screen SC1. In this case, the encryption key CK1 is not transmitted to the terminal located where the unauthorized person is (NO in T122). Although the encrypted scan data may be transmitted to the terminal located where the unauthorized person is, the unauthorized person may not be able to see the image of the document. In this situation, the image of the document may be protected from the unauthorized person.

Figure 4:
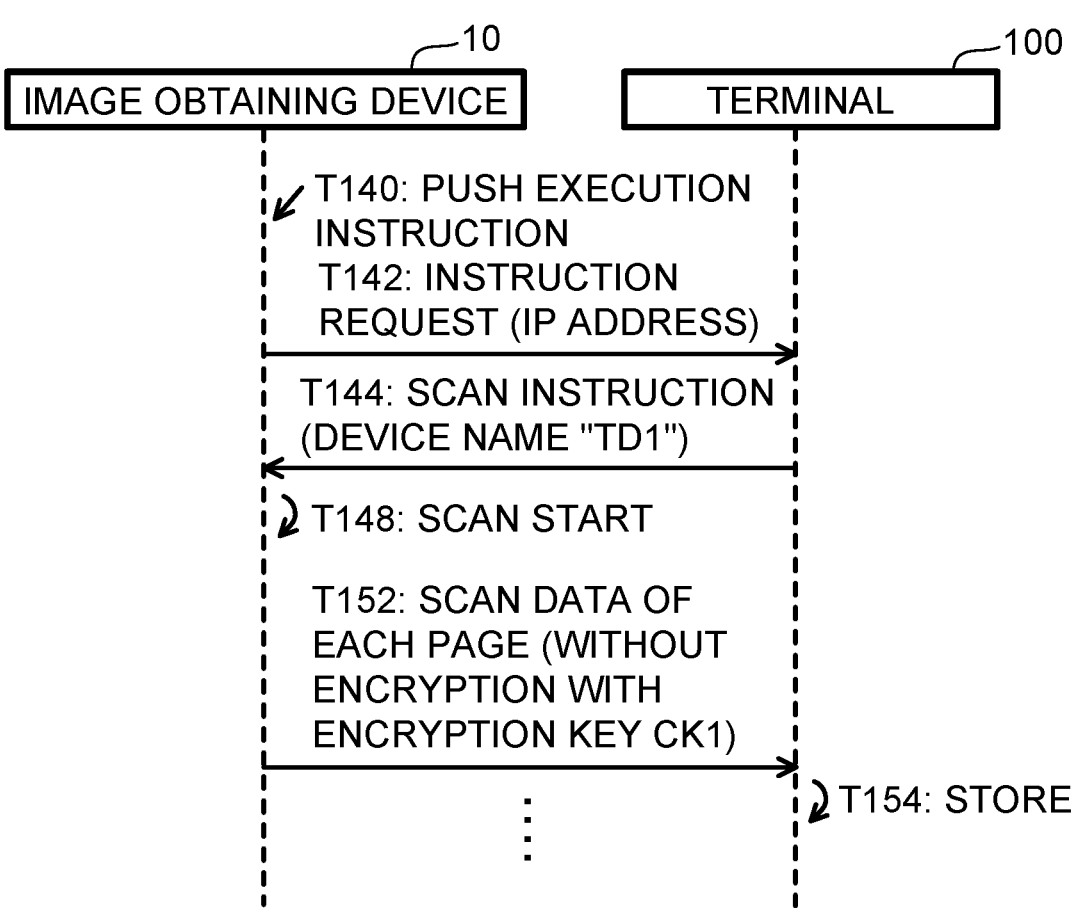
FIG. 4 is a sequence diagram of a specific case of the push scan.

Push Scan; FIG. 4

An example of the push scan of this embodiment is described with reference to FIG. 4. Processes T140, T142 and T144 are examples of the processes T10, T12 and T14 in FIG. 2, respectively. An instruction request of T142 includes an IP address of the terminal 100, and the scan instruction of T144 includes the device name "td1" of the terminal 100. For example, the image obtaining device 10 stores a list of terminals (e.g., a list of IP addresses) that may communicate with the image obtaining device 10. A push scan instruction in T140 is generated when the user selects one of the terminals from the list of terminals. The list of terminals is displayed on the display 16.

A process T148 is the same as the process T108 in FIG. 3. On the other hand, in the push scan, the encryption key CK1 is not generated, and the scan data of each page of the document is not encrypted by the encryption key CK1. In T152 of the push scan, the image obtaining device 10 transmits the scan data of each page of the document to the terminal 100. As a result, in T154, the terminal 100 stores the scan data of each page of the document and displays an image representing the document.

As described above, the unauthorized person may not be able to access the image obtaining device 10 in the office. The push scan is performed in response to an operation of the operation unit 14 of the image obtaining device 10 that the unauthorized person may not be able to operate. Therefore, in the push scan, the encryption and decryption using the encryption key CK1 may be omitted, thereby reducing the processing load on the image obtaining device 10 and the terminal 100. On the other hand, in the pull scan that may be unintentionally operated by the unauthorized person, the information on the document may be strongly protected by the encryption key CK1.

Further, the image obtaining device 10 generates a unique encryption key CK1 each time a scan data is generated in accordance with a scan instruction (T106 in FIG. 3). That is, the current encryption key is different from the previous encryption key. Generating the unique encryption key may provide enhanced security to the information on the document.

Correspondence

The image obtaining device 10 is an example of a "communication system" or an "image obtaining device". A combination of the scan unit 12 and at least one of the operation unit 14 or the display 16 is an example of an "image obtaining module". The operation unit 14 is an example of an "operation structure". The LAN I/F 20 is an example of a "communication interface". The scan data is an example of "image data". The encrypted scan data is an example of "encrypted image data". The terminal 100 is an example of a "terminal". The encryption key CK1 is an example of an "encryption key". The situation in which the image obtaining device determines YES in T122 of FIG. 3 is an example of a "first situation". The situation in which the image obtaining device determines NO in T122 is example of a "second situation". Selecting the OK button on the confirmation screen SC1 is an example of a "predetermined operation". The scan instruction in T104 is an example of a "first obtaining instruction". The push scan instruction in T140 of FIG. 4 is an example of a "second obtaining instruction".

SECOND EMBODIMENT

The second embodiment is the same as the first embodiment except that the determination of whether to transmit the encryption key CK1 and the subsequent processing thereof are different from those of the first embodiment.

Figure 5:
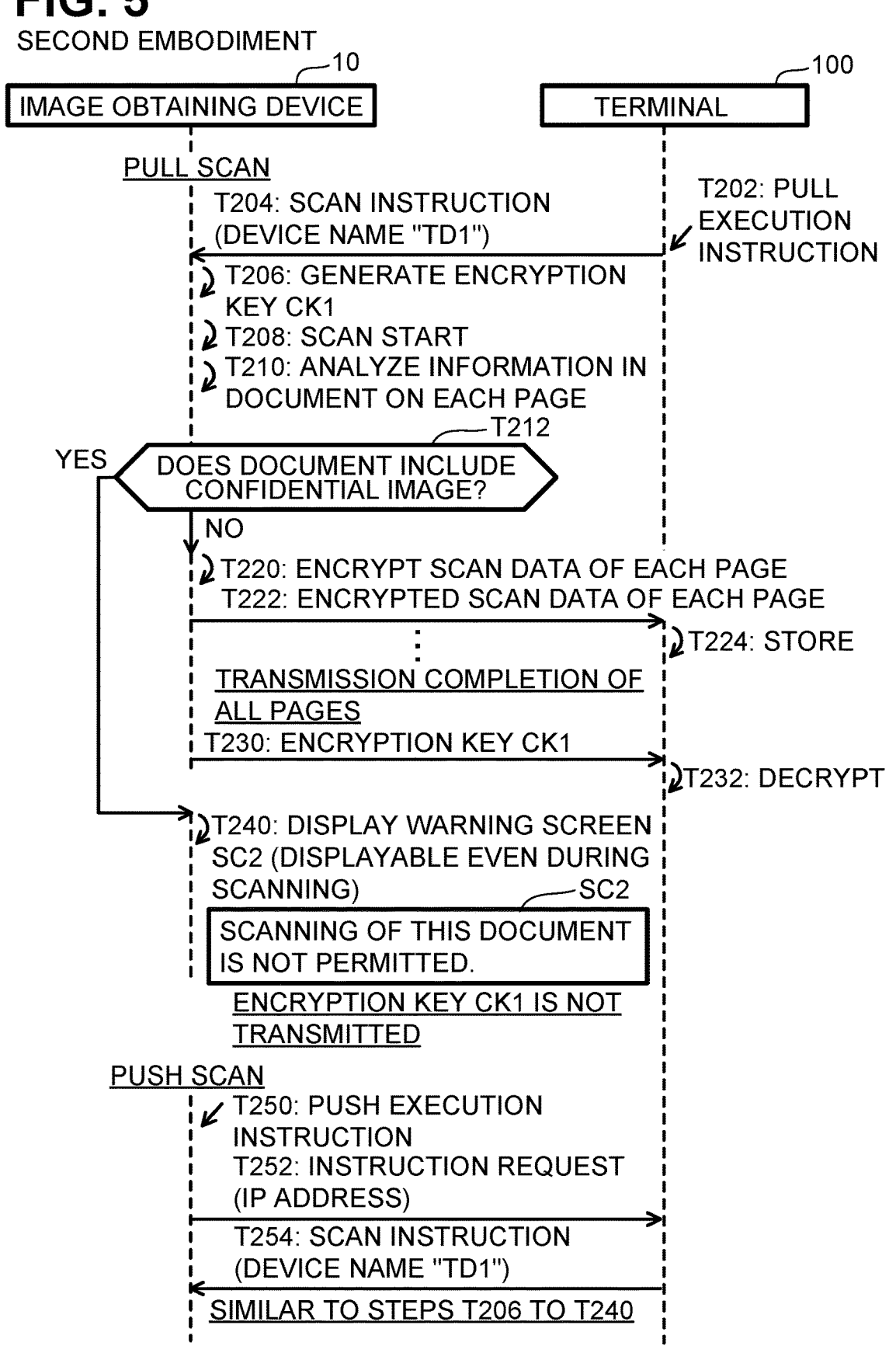
FIG. 5 is a sequence diagram of a specific case of the pull scan and the push scan.

Pull Scan; FIG. 5

An example of the pull scan according to the second embodiment is described with reference to FIG. 5. Processes T202, T204, T206 and T208 are the same as the processes T102, T104, T106 and T108 in FIG. 3, respectively. In T210, the image obtaining device 10 analyzes whether confidential information is included in the document. For example, in a case where confidential information is included in a document, the document includes a confidential image indicating that the document is confidential. The confidential image may be a character string "Confidential" or a predetermined symbol indicating confidentiality. In analysis of T210, character recognition is used for recognizing a character string indicating confidentiality on each page. In a modification, a known technique other than character recognition may be used for the analysis of T210. The known technique may be pattern matching for extracting an image matching a predetermined symbol indicating confidentiality from an image of each page or machine learning for determining whether an image similar to the predetermined symbol is included in each page using a learning model.

In T212, the image obtaining device 10 determines whether the analysis result in T210 indicates that at least one page of all of the plurality of pages of the document includes a confidential image. In a case where the image obtaining device 10 determines that the analysis result in T210 indicates that no confidential image is included in any page of the document (NO in S212), the image obtaining device 10 executes the processing of T220, T222, T224, T230 and T232. In, T220, the image obtaining device 10 scans each page of the document to generate scan data of each page, and encrypts the scan data of each page by using the encryption key CK1. In T222, the image obtaining device 10 transmits the encrypted scan data of each page to the terminal 100. In T224, the terminal 100 stores the encrypted scan data of each page received from the image obtaining device 10. In T230, the image obtaining device 10 transmits the encryption key CK1 to the terminal 100. In T232, the terminal 100 uses the encryption key CK1 received from the image obtaining device 10 in T230 to decrypt the encrypted scan data of each page of document stored in T224. That is, the encrypted scan data of all of the plurality of pages of the document and the encryption key CK1 are transmitted to terminal 100 after completing the transmission of the encrypted scan data of all of the plurality of pages of the document (T230).

In a case where the image obtaining device 10 determines that the analysis result in T210 indicates that at least one page includes a confidential image (YES in S212), the image obtaining device 10 skips the processes of T220, T222, T224, T230 and T232 and executes a process T240. In T240, the image obtaining device 10 displays a warning screen SC2 on the display unit 16. The warning screen SC2 includes a message indicating that a scan of the document is not permitted such that a user may recognize that the scan of the document is not permitted. In addition, the encryption key CK1 is not transmitted to the terminal 100 because the processes T220, T222, T224, T230 and T232 are skipped. In modification, the warning screen SC2 may not be displayed.

As described above, the document includes a plurality of pages, and the scan data is generated for each page. The analysis in T210 may be executed in parallel with the scan of the document, and the warning screen SC2 may be displayed even during the scan. For example, if it is determined in the analysis of the first to fifth pages that no confidential image is included in any page, the image obtaining device 10 transmits the encrypted scan data of the first to fifth pages to the terminal 100 (T220). In response to determining that the confidential image is included in the sixth page, the image obtaining device 10 displays the warning screen SC2 (T240). In this case, scan from the seventh page to the final page may be suspended. That is, the encrypted scan data of the first to fifth pages is transmitted to the terminal 100, but the encryption key CK1 is not transmitted to the terminal 100. Accordingly, the encrypted scan data from the first page to the fifth page is not decrypted. In modification, the analysis in T210 may be performed after all of the plurality of pages of the document have been scanned. In this modification, the warning screen SC2 may be displayed after the transmission of the encrypted scan data of the last page is completed.

According to the above configuration, the scan data of the document in which the confidential information is not included is protected by being encrypted with the encryption key CK1 (NO in T212). On the other hand, the scan data of the document including confidential information is protected by not transmitting the encryption key CK1. Accordingly, even an employee of the office in which the image obtaining device 10 is located may not be allowed to obtain the scan data of the document having the confidential information, thereby preventing the confidential information from leaking to the outside of the office.

Push Scan; FIG. 5

In the second embodiment, the scan data may be encrypted even in the push scan. The processes T250, T252 and T254 in FIG. 5 are the same as the processes T140, T142 and T144 in FIG. 4. The image obtaining device 10 performs the same processes as T208, T210, T212, T220, T222, T224, T230, T232 and T240. Thus, even in the push scan, the encryption key CK1 is transmitted to the terminal 100 in a case where the confidential information is not included in the document, whereas the encryption key CK1 is not transmitted to the terminal 100 in a case where the confidential information is included in the document. Even in the push scan, leaking confidential information to the outside of the office may be prevented.

Correspondence

The situation in which NO is determined in T212 of FIG. 5 is an example of "first situation". The situation in which YES is determined in T212 of FIG. 5 is an example of "second situation". The confidential image is an example of a "predetermined image". The warning screen SC2 is an example of "warning screen". The display unit 16 is an example of a "display unit".

THIRD EMBODIMENT

The third embodiment is the same as the second embodiment except that the analysis of the scan data is performed by the analysis server 200 capable of communicating with the image obtaining device 10 and that the process in a case where confidential information is included in the document is different.

Figure 6:
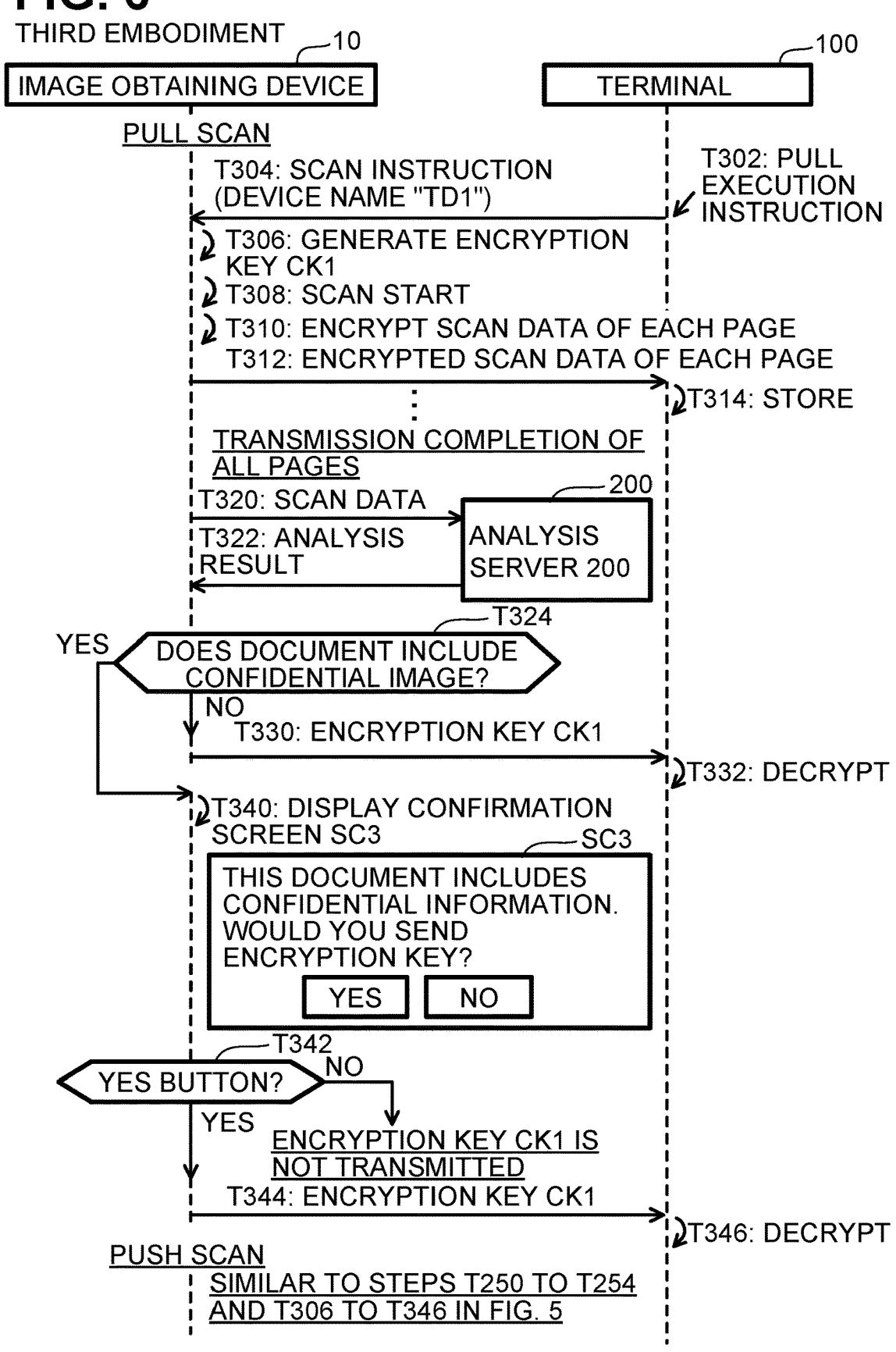
FIG. 6 is a sequence diagram of a specific case of the pull scan and the push scan.

Specific Case of Pull Scan; FIG. 6

With reference to FIG. 6, an example of the pull scan of the third embodiment is described. The processes T302, T304, T306 and T308 are the same as the processes T202, T204, T206 and T208 in FIG. 5, respectively. The image obtaining device 10 encrypts the scan data of each page in T310, and transmits the encrypted scan data of each page to the terminal 100 in T312. In T314, the terminal 100 stores the encrypted scan data of each page received from the image obtaining device 10. In the third embodiment, in response to completion of transmission of the encrypted scan data of all of the plurality of pages of the document, the image obtaining device 10 executes processes T320 and thereafter.

In T320, the image obtaining device 10 transmits the scan data of all of the plurality of pages of the document to the analysis server 200. The analysis server 200 may be located in the LAN 4 or on the Internet.

In T320, the analysis server 200 receives the scan data of all the of the plurality of pages of the document from the image obtaining device 10. In response to receiving the scan data, the analysis server 200 performs the same analyzing process as in T210 of FIG. 5. In T322, the analysis server 200 transmits the analysis result to the image obtaining device 10.

In response to receiving the analysis result in T322, the image obtaining device 10 executes T324. The process T324 is the same as the process in T212 of FIG. 5. If the image obtaining device 10 determines that the analysis result received in T322 indicates that none of all of the plurality of pages of the document includes a confidential image (NO in S324), the image obtaining device 10 executes the process T330. The processes T330 and T332 are the same as the processes T230 and T232 in FIG. 5.

If the image obtaining device 10 determines that the analysis result received in T322 indicates that at least one page of the document contains a confidential image (NO in S324), the image obtaining device 10 executes the process T340. In T340, the image obtaining device 10 displays a confirmation screen SC3 on the display unit 16. The confirmation screen SC3 may include a message indicating that confidential information is included in the document and confirming whether to permit transmission of the encryption key CK1. The confirmation screen SC3 includes a YES button and a NO button.

The image obtaining device 10 determines whether selecting the YES button of the confirmation screen SC3 is operated on the operation unit 14 in T342. In response to determining that selecting the YES button on the confirmation screen SC3 has been operated (YES in T342), in T344, the image obtaining device 10 transmits the encryption key CK1 to the terminal 100. The process T346 is the same as the process T332. On the other hand, in response to determining that selecting the NO button on the confirmation screen SC3 has been operated (NO in T342), the image obtaining device 10 skips the process of T344 and ends the process of the push scan in FIG. 6. That is, the encryption key CK1 is not transmitted to the terminal 100.

It may be assumed that most employees are not permitted to scan a document having confidential information, but some employees are permitted to scan the document having the confidential information. According to the configuration of the third embodiment, some employees are allowed to obtain the scan data having the confidential information by selecting the YES button on the confirmation screen SC3. The convenience of some employees may be enhanced. Push Scan; FIG. 6

In the third embodiment, the scan data may be encrypted even in the push scan as in the second embodiment. In the push scan of the third embodiment, after the processes of T250, T252 and T254 of FIG. 5 are executed, the processes of T306, T308, T310, T312, T314, T320, T322, T324, T330, T332, T340, T342, T344 and T346 of FIG. 6 are executed. In the third embodiment, in a case where (1) confidential information is not included in the document or in a case where (2) confidential information is included in the document and the YES button of the confirmation screen SC3 is selected, the encryption key CK1 is transmitted to the terminal 100. On the other hand, in a case where confidential information is included in the document and the NO button of the confirmation screen SC3 is selected, the encryption key CK1 is not transmitted to the terminal 100. Accordingly, in the push scan, confidential information may be prevented from leaking to the outside of the office, and the convenience of some employees may be enhanced. Correspondence The situation where NO is determined in T324 of FIG. 6 is an example of a "first situation". The situation where YES is determined in T324 and NO is determined in T342 is an example of a "second situation". The confirmation screen SC3 is an example of "confirmation screen". The display unit 16 is an example of a "display unit". The instruction to select the YES button on the confirmation screen SC3 is an example of the "specific instruction".

FOURTH EMBODIMENT

The fourth embodiment is the same as the second embodiment except that the memory 34 of the image obtaining device 10 stores a user table 42 and the processes of the image obtaining device 10 are different.
Configuration of the User Table 42; FIG. 1

The user table 42 stores, for each user who is authorized to use the image obtaining device 10, a user name, a password, and an attribute in association with each other. In response to successful authentication using the user name and the password, the image obtaining device 10 permits the user to operate the image obtaining device 10. In modification, biometric authentication or authentication using an IC card may be alternatively provided.

Figure 7:
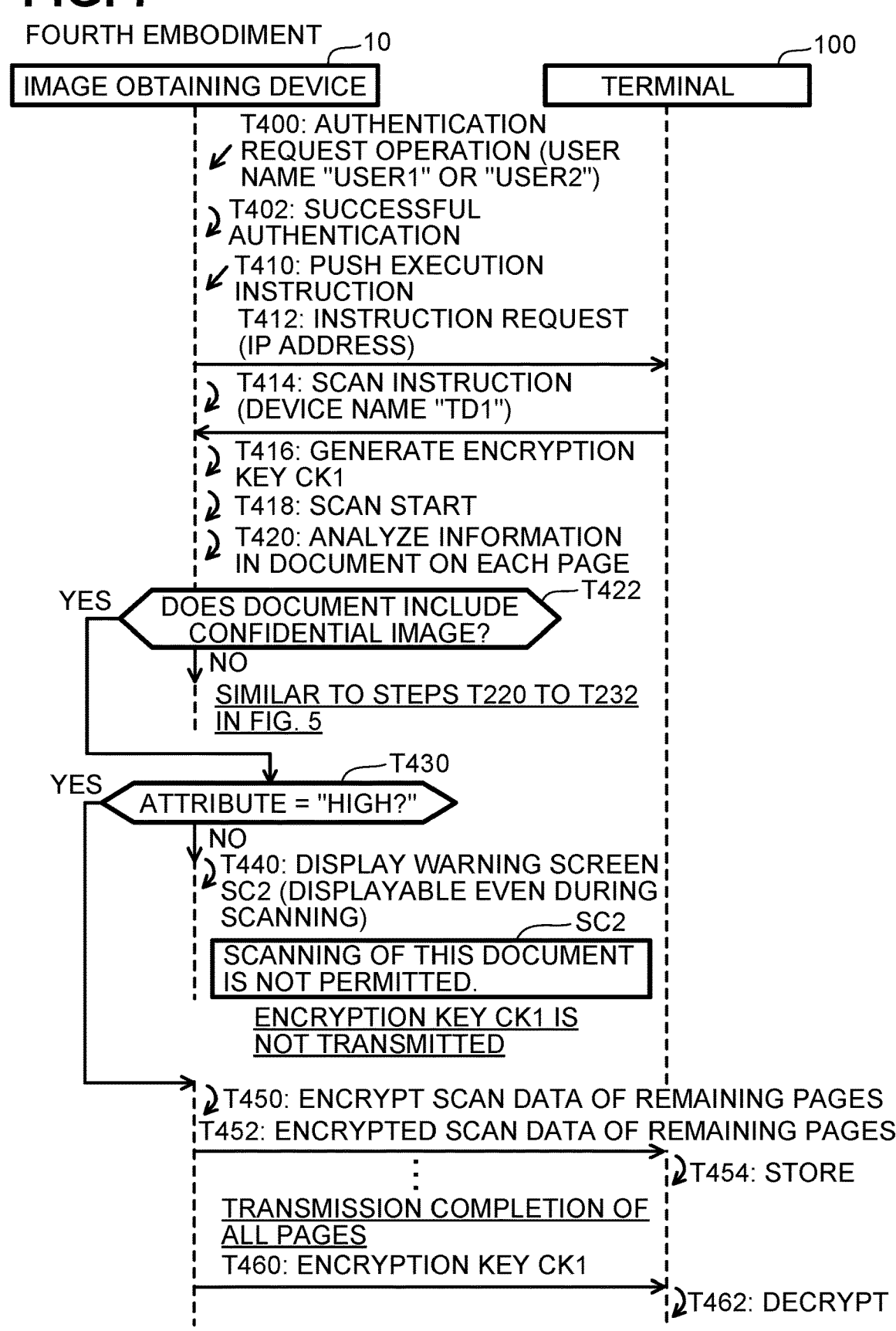
FIG. 7 is a sequence diagram of a specific case of the push scan.

The attribute in the user table 42 indicates one of the values "high" and "low". The value "high" indicates a user who is permitted to handle confidential information. The value "low" indicates a user who is not permitted to handle confidential information. The values "high" and "low" are merely examples.
Push Scan; FIG. 7

An example of the push scan of the fourth embodiment is described with reference to FIG. 7. In T400, the user performs an authentication request operation on the image obtaining device 10 for requesting authentication using a user name and a password. The authentication request operation includes inputting the user name and the password.

In T402, the image obtaining device 10 authenticates the user name and the password input in T400. In this case, the user name and password input in T400 match the data in the user table 42, and authentication is successful. In response to the successful authentication, the image obtaining device 10 changes a state of the image obtaining device 10 from a state in which the input of the push scan instruction is prohibited to a state in which the input of the push scan instruction is permitted. The state in which the input of the push scan instruction is permitted may be a state in which a button for inputting the push scan instruction is displayed on the display unit 16. If the authentication fails in T402, the state of the image obtaining device 10 is maintained in a state in which the input of the push scan instruction is prohibited.

In response to the successful authentication, the image obtaining device 10 executes the processes T410, T412 and T414. The processes T410, T412 and T414 are the same as the processes T140, T142 and T144 in FIG. 4. The processes T416, T418, T420 and T422 are the same as the processes T206, T208, T210 and T212 in FIG. 5. In a case where it is determined that the analysis result in T420 indicates that the confidential image is not included in any page of the document (NO in T422), the image obtaining device 10 executes the same processes as T220, T222, T224, T230 and T232 of FIG. 5 to transmit the encryption key CK1.

If the image obtaining device 10 determines that the analysis result in T420 indicates that at least one page of the document contains a confidential image (YES in T422), the image obtaining device 10 executes the process T430. In T430, the image obtaining device 10 determines whether the attribute stored in the user table 42 in association with the user name input in T400 indicates the value "high".

In a case where it is determined that the attribute stored in association with the user name input in T400 indicates the value "low" (NO in T430), the image obtaining device 10 executes the process T440. The process T440 is the same as T240 in FIG. 5, and the encryption key CK1 is not transmitted to the terminal 100. In modification, the warning screen SC2 may not be displayed in T440.

If the image obtaining device 10 determines that the attribute stored in association with the user name input in T400 indicates the value "high" (YES in T430), the image obtaining device 10 executes the process T450. For example, in a case where the confidential image is included in the sixth page, the encrypted scan data up to the fifth page is transmitted to the terminal 100, and the determination in the process T430 is executed before the encrypted scan data of the sixth page is transmitted to the terminal 100. In T450, the image obtaining device 10 encrypts the remaining pages (e.g., from the sixth page to the last page). In T452, the image obtaining device 10 transmits the encrypted scan data of the remaining pages to the terminal 100. Accordingly, in T454, the terminal 100 stores the encrypted scan data of all pages.

In response to completion of the transmission of the encrypted scan data of the last page, in T460, the image obtaining device 10 transmits the encryption key CK1 to the terminal 100. Accordingly, in T462, the terminal 100 decrypts the encrypted scan data of all pages.

It may be assumed that an employee having an attribute "low" is not permitted to scan a document having confidential information, but an employee having an attribute "high" is permitted to scan a document having confidential information. According to the configuration of the fourth embodiment, in a case where the authentication by the employee having the attribute "high" is successful in the image obtaining device 10, the encryption key CK1 is transmitted to the image obtaining device 10 even if confidential information is included in the document. The employee having the attribute "high" may obtain scan data of the document having confidential information by performing the authentication request operation. The convenience of the employee having the attribute "high" may be enhanced.

The technique of the fourth embodiment may also be adopted for pull scan. For example, in pull scan, an authentication request operation in T400 may be executed by the terminal 100, and data (i.e., a user name and a password) input by the authentication request operation may be transmitted from the terminal 100 to the image obtaining device 10.

Correspondence

The situation where NO is determined in T422 of FIG. 6 is an example of a "first situation". The situation where YES is determined in T422 and NO is determined in T430 is an example of a "second situation". The attribute "low" is an example of a "first attribute". The attribute "high" is an example of a "second attribute".

Although specific examples of the technique disclosed herein have been described in detail above, these are merely examples and do not limit the scope of the claims. Various modifications and changes of the specific examples described above are included in the technique described in the claims. Modifications of the embodiment described above will be described below.

Modification 1

The confirmation screen SC1 of FIG. 3 may not include the OK button. In this case, for example, in a case where a predetermined mechanical button in the operation unit 14 is selected after the transmission of the encrypted scan data, the process T130 may be executed. In this modification, the operation of selecting the predetermined mechanical button is an example of the "predetermined operation".

Modification 2

The image obtaining device 10 may determine NO in T122 of FIG. 3 in a case where a delete button for deleting the confirmation screen SC1 is selected. Further, the image obtaining device 10 may determine NO in T122 of FIG. 3 in a case where a predetermined time elapses without performing any operation after the confirmation screen SC1 is displayed. In this modification, a situation where the delete button is selected or a situation where a predetermined time elapses after the confirmation screen SC1 is displayed is an example of the "second situation".

Modification 3

In the first embodiment, the transmission of the encrypted scan data and the transmission of the encryption key may be performed even in the push scan instead of the process of FIG. 4.

Modification 4

The target analyzed in T210 of FIG. 5 may be, for example, personal information indicating a personal address, a public certificate, a card, an image violating the copy right, a mark indicating the copy right, or an image indicating copy prohibition. Each of the images listed above is an example of a "predetermined image".

Modification 5

The confirmation screen SC3 of FIG. 6 may not include the OK button. In this case, for example, in response to being selected a predetermined mechanical button in the operation unit 14 after the confirmation screen SC3 is displayed, the process T344 may be executed. In this modification, the selection of the predetermined mechanical button is an example of the "specific instruction".

Modification 6

The image obtaining device 10 may determine NO in T342 of FIG. 6 if a delete button for deleting the confirmation screen SC3 is selected. Further, the image obtaining device 10 may determine NO in T342 of FIG. 6 if a predetermined time elapses without performing any operation after the confirmation screen SC3 is displayed. In this modification, each of the situation in which the delete button is selected and the situation in which the predetermined time elapses after the confirmation screen SC3 is displayed is an example of the "second situation".

Modification 7

The process T106 in FIG. 3 may be omitted. In this case, the image obtaining device 10 may store a list of encryption keys in advance. The image obtaining device 10 may encrypt the scan data using one encryption key selected from the list.

Modification 8

At least one of the warning screen SC2 of FIG. 5, the confirmation screen SC3 of FIG. 6, or the warning screen SC2 of FIG. 7 may be displayed on the terminal 100. In this modification, the terminal 100 is an example of a "display unit".

In the above-described embodiment, the processes of FIGS. 2 to 7 are realized by the CPU 32 executing the program 40. Alternatively, any of the processes may be implemented by hardware such as a logic circuit.

Further, the technical elements described in the present specification or the drawings exhibit technical utility alone or in various combinations, and are not limited to the combinations described in the claims at the time of filing. In addition, the techniques illustrated in the present specification or the drawings achieve a plurality of objects at the same time, and have technical utility by achieving one of the objects.

What is claimed is:

1. An image obtaining device, comprising:
an operation structure;
a communication interface configured to communicate with a terminal;
a controller in communication with the communication interface, the controller configured to:
generate image data based on either of a first obtaining instruction for a pull scan received from the terminal via the communication interface or a second obtaining instruction for a push scan input on the operation structure;
generate encrypted image data using an encryption key and the image data generated based on the first obtaining instruction;
transmit the encrypted image data to the terminal via the communication interface;
transmit the encryption key to the terminal via the communication interface in a first situation; and
transmit the image data generated based on the second obtaining instruction to the terminal via the communication interface,
wherein the encryption key is not transmitted to the terminal in a second situation different from the first situation, and
wherein the first situation is a situation where the image data is generated based on the first obtaining instruction and the user selects a button in a confirm screen including a device name indicating a device to transmit the encryption key, the button being for the user to agree to transmitting of the encryption key to the device, and
the second situation is a situation where the image data is generated based on the second obtaining instruction.

2. The image obtaining device according to claim 1,
wherein the controller is further configured to determine whether situation of the image obtaining device is the first situation or the second situation,
wherein the controller transmits the encryption key to the terminal in response to determining of the first situation, and
wherein the controller does not transmit the encryption key to the terminal in response to determining of the second situation.

3. The image obtaining device according to claim 1, further comprising:
an operation structure,
wherein the first situation is a situation where the image data is generated based on the first obtaining instruction and a predetermined operation is performed on the operation structure after the encrypted image data is transmitted to the terminal, and
wherein the second situation is the situation where the image data is generated based on the second obtaining instruction and a situation where the image data is generated based on the first obtaining instruction and the predetermined operation is not performed on the operation structure after the encrypted image data is transmitted to the terminal.

4. The image obtaining device according to claim 1,
wherein the controller transmits the encryption key to the terminal after completely transmitting the encrypted image data to the terminal.

5. The image obtaining device according to claim 1,
wherein the controller is further configured to generate a uniquely encryption key each time the image data is generated.

6. A non-transitory computer-readable recording medium storing computer-readable instructions for an image obtaining device,
the image obtaining device comprising:
an operation structure;
a communication interface configured to communicate with a terminal;
a processor,
wherein the computer-readable instructions, when executed by the processor, cause the image obtaining device to:
generate image data based on either of a first obtaining instruction for a pull scan received from the terminal via the communication interface or a second obtaining instruction for a push scan input on the operation structure;
generate encrypted image data using an encryption key and the image data generated based on the first obtaining instruction;
transmit the encrypted image data to the terminal via the communication interface;
transmit the encryption key to the terminal via the communication interface in a first situation;
transmit the image data generated based on the second obtaining instruction to the terminal via the communication interface; and
wherein the encryption key is not transmitted to the terminal in a second situation different from the first situation,
wherein the first situation is a situation where the image data is generated based on the first obtaining instruction and the user selects a button in a confirm screen including a device name indicating a device to transmit the encryption key, the button being for the user to agree to transmitting of the encryption key to the device, and
the second situation is a situation where the image data is generated based on the second obtaining instruction.

7. A control method for an image obtaining device,
the image obtaining device comprising an operation structure and a communication interface configured to communicate with a terminal,
wherein the control method comprising:
generating image data based on either of a first obtaining instruction for a pull scan received from the terminal via the communication interface or a second obtaining instruction for a push scan input on the operation structure;

generating encrypted image data using an encryption key and the image data generated based on the first obtaining instruction;

transmitting the encrypted image data to the terminal via the communication interface;

transmitting the encryption key to the terminal via the communication interface in a first situation;

transmitting the image data generated based on the second obtaining instruction to the terminal via the communication interface; and wherein the encryption key is not transmitted to the terminal in a second situation different from the first situation, wherein the first situation is a situation where the image data is generated based on the first obtaining instruction and the user selects a button in a confirm screen including a device name indicating a device to transmit the encryption key, the button being for the user to agree to transmitting of the encryption key to the device, and the second situation is a situation where the image data is generated based on the second obtaining instruction.

8. A communication system comprising:

an image obtaining module; and a controller in communication with the image obtaining module and configured for communication with a terminal, the controller configured to:

cause the image obtaining module to obtain image data;

encrypt the image data if an instruction to obtain image data is received from the terminal by using an encryption key; and communicate either of the encrypted image data or non-encrypted image data to the terminal, the controller further configured to perform either of a first process or a second process, wherein:

the first process includes communication of the encryption key to the terminal if a user initiates, at the terminal, communication of the encrypted image data to the terminal and a user authorizes communication of the encryption key, and communication of the non-encrypted image data to the terminal if a user initiates, at the image obtaining module, communication of the non-encrypted image data to the terminal; and the second process includes communication of the encryption key to the terminal if a user initiates, at the image obtaining module, communication of the encrypted image data to the terminal and the user selects a button in a confirm screen including a device name indicating a device to transmit the encryption key, wherein the button is for the user to agree to transmitting of the encryption key to the device.

9. The communication system according to claim 8, wherein the image obtaining module includes a scan unit and at least one selected from a group of a display and an operation structure.

10. The communication system according to claim 8, wherein the image obtaining module is connected to a housing.

11. The communication system according to claim 8, wherein the controller is further configured to determine whether the user is an authorized user.

12. The communication system according to claim 8, wherein the communication system is configured as a scanner.

* * * * *